United States Patent
Lee

(10) Patent No.: US 9,364,908 B2
(45) Date of Patent: Jun. 14, 2016

(54) DEBURRING DEVICE

(71) Applicant: KOREA INSTITUTE OF INDUSTRIAL TECHNOLOGY, Cheonan-si (KR)

(72) Inventor: Jang Yong Lee, Cheonan-si (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 82 days.

(21) Appl. No.: 14/405,397

(22) PCT Filed: Dec. 20, 2012

(86) PCT No.: PCT/KR2012/011207
§ 371 (c)(1),
(2) Date: Dec. 3, 2014

(87) PCT Pub. No.: WO2013/187567
PCT Pub. Date: Dec. 19, 2013

(65) Prior Publication Data
US 2015/0151374 A1    Jun. 4, 2015

(30) Foreign Application Priority Data
Jun. 11, 2012   (KR) ........................ 10-2012-0062235

(51) Int. Cl.
*B23D 79/02*    (2006.01)
*B23D 79/08*    (2006.01)

(52) U.S. Cl.
CPC .............. *B23D 79/021* (2013.01); *B23D 79/02* (2013.01); *B23D 79/08* (2013.01)

(58) Field of Classification Search
CPC ....... B23D 79/021; B23D 79/02; B23D 79/08
USPC .............................................. 30/170
See application file for complete search history.

(56) References Cited

U.S. PATENT DOCUMENTS 3,327,588 A * 6/1967 Yandell ................. B23D 79/00
                                                           30/170
3,610,098 A * 10/1971 Walker ................. B23D 79/02
                                                           409/140

(Continued)

FOREIGN PATENT DOCUMENTS

| JP | 05-329709 A | 12/1993 |
|---|---|---|
| KR | 10-2001-0056231 A | 7/2001 |

(Continued)

*Primary Examiner* — Sean Michalski
(74) *Attorney, Agent, or Firm* — Gokalp Bayramoglu

(57) ABSTRACT

Disclosed, herein is a deburring device for removing burrs generated on a joint between window frames. The deburring device includes: first and second scrapers (111) and (112) provided on an end of a scraper rod that is moved back and forth toward the joint; first scraper-guide bars (111) and second scraper-guide bars (112) assembled with left and right side surfaces of the first and second scrapers supports (131) and (132) respectively assembled with corresponding left and right outer surfaces of the scraper-guide bars; and push bar (141) and (142) provide to vary a distance between the first and second scrapers. Each push bar includes: on a front end thereof a contact member making contact with corresponding-upper and lower contact rollers provided on the first and second scraper-guide bars; and a guide member moving back and forth along a guide depression formed in the corresponding support.

7 Claims, 7 Drawing Sheets

(56) References Cited

U.S. PATENT DOCUMENTS

| | | | | |
|---|---|---|---|---|
| 4,080,735 | A | * | 3/1978 | Michalski .............. B23D 79/08 30/169 |
| 4,604,802 | A | * | 8/1986 | Samuelsson ............. B26D 3/28 269/157 |
| 5,054,201 | A | * | 10/1991 | Andrews ............. B23B 27/1662 15/236.08 |
| 6,591,501 | B1 | * | 7/2003 | Phillips ..................... B26B 5/00 30/2 |
| 6,988,776 | B1 | * | 1/2006 | Davidson .............. E02F 3/7618 15/93.1 |
| 7,152,930 | B2 | * | 12/2006 | Jertson ................. E04G 23/006 15/93.1 |
| 7,313,993 | B2 | * | 1/2008 | Foerderer ................ G01N 1/06 83/437.6 |
| 7,373,859 | B1 | * | 5/2008 | Shirlin .................. E04D 15/003 30/170 |
| 7,685,718 | B2 | * | 3/2010 | Ames ...................... B23B 5/167 30/299 |
| 2004/0098870 | A1 | * | 5/2004 | Nemazi .................. B23D 51/10 30/392 |
| 2015/0231714 | A1 | * | 8/2015 | Menei .................. B23D 79/021 409/300 |

FOREIGN PATENT DOCUMENTS

| | | |
|---|---|---|
| KR | 20-0352538 Y1 | 6/2004 |
| KR | 10-2007-0099719 A | 10/2007 |
| KR | 101092374 B1 | 12/2011 |

* cited by examiner

DEBURRING DEVICE

TECHNICAL FIELD

The present invention generally relates to &burring devices and, more particularly, to a deburring device that can rapidly remove burrs generated on the joint between window frames when ends of the window frame made of plastic resin are butt-joined with each other, thus markedly enhancing work productivity in manufacturing a window case.

BACKGROUND ART

Generally, window cases for installing window are mainly made of wood, metal or plastic. The use of window cases made of plastic such as PVC is becoming increasingly common because of advantages of being light and inexpensive.

FIG. 5 is a perspective view showing a joint of a typical window frame.

To manufacture a typical plastic window case, as shown in FIG. 5, a joint 3 at Which window frames 1 intersect at right angles is formed by bringing corresponding portions of the window frames 1 into contact with a heating plate and bonding the melted portions with each other.

As shown in FIG. 5, such a fusion bonding method causes burrs B around the joint 3, particularly, on inner surfaces of the window frames 1, because pressure is applied to the joined window frames 1 during the fusion bonding process.

The burrs generated on the joint 3 must be removed because they act as obstacles when fitting a glass plate into the window frames and defile the appearance of the window case.

Formerly, a worker has used a cutting tool such as a cutter and scraped burrs B to remove them before the burrs B generated on the inner surfaces of the window frames are cooled and hardened. However, such a manual burr removal method has problems in that the worker can easily get hurt and the work productivity in manufacturing the window case is markedly reduced because of long time it takes to manufacture the window case.

A representative example of a conventional deburring device was proposed in Korean Patent Registration No. 10-1092374 (date: May 23, 2011). The conventional deburring device includes: a moving body provided so as to be capable of moving back and forth and having a pair of supports on a front end thereof a scraper rotatably coupled to the supports and provided with a blade extending from the body downward at a predetermined angle; a first elastic member connected at a first end thereof to the scraper and connected at a second end thereof to the moving body so as to elastically support the scraper in one direction; and a locking unit fixing the scraper at a desired work position at which the edge of the blade of the scraper is brought into contact with the surfaces of window frames by rotating the scraper. The scraper removes buns from the inner sidewalls of the window frames while the position of the scraper is converted to the work position by bringing the edge of the blade into the inner sidewalls of the window frames and moving the moving body forward. The scraper also removes buns from the bottom of the window frames when the moving body is moved backward.

However, in the conventional deburring device, to remove burrs generated on inner and outer surfaces of the joint between the window frames, an inner surface deburring operation must be primarily conducted and then a secondary deburring operation must be conducted after the window frames are turned upside down to change the location of the joint of the window frames. Therefore, time required to conduct the deburring operation is excessively increased. Thereby, work productivity is reduced. During the deburring operation, the possibility of a worker getting hurt is comparatively high. It is difficult to simultaneously remove buns generated on inner and outer sides of the joint.

DISCLOSURE

Technical Problem

Accordingly, the present invention has been made keeping in mind the above problems occurring in the prior art, and an object of the present invention is to provide a deburring device that can simultaneously remove burrs generated on both sides of a joint of window frames and is configured such that When scrapers enter the window frames to conduct the deburring. operation, interference between the scrapers and the window frames can be prevented.

Technical Solution

In order to accomplish the above object, the present invention provides a deburring, device for removing burrs generated on a joint between window frames, including: first and second scrapers provided on an end of a scraper rod that is moved back and forth toward the joint to remove the burrs: a pair of first scraper-guide bars and a pair of second scraper-guide bars assembled with left and right side surfaces of the first and second scrapers so that the first and second scrapers are supported by the first and second scraper-guide bars so as to be capable of moving back and forth in a horizontal direction; a pair of supports respectively assembled with corresponding left and right outer surfaces of the first and second scraper-guide bars so that the first and second scraper-guide bars are supported by the supports so as to be capable of moving back and forth in a vertical direction; and a pair of push bars provided to vary a distance between the first and second scrapers, each of the push bars including: on a front end thereof a contact member making contact with corresponding upper and lower contact rollers provided on the left and right outer surfaces of the first and second scraper-guide bars: and a guide member moving back and forth along a guide depression formed in the corresponding support.

The first and second scrapers may respectively have first and second guide holes therein so that the first and second scrapers are vertically guided by a vertical guide rod provided on a front end of the scraper rod. The first and second scrapers may be assembled with the vertical guide rod so as to be slidable in the vertical direction through the first and second guide holes.

Each of the first and second scraper-guide bars may include, on an inner surface thereof, a guide protrusion assembled with a corresponding one of the slide. grooves formed in outer surfaces of the first and second scrapers.

Each of the supports may include, on respective upper and lower surfaces thereof, upper and lower vertical guide bars assembled with corresponding guide depressions formed in outer surfaces of the first and second scraper-guide bars The upper and lower contact rollers may be respectively assembled with upper and lower roller shafts provided on the first and second scraper-guide bars, and an elastic member may be connected to ends of the upper and lower roller shafts of each pair of the first and second scraper-guide bars.

The upper and lower contact rollers may be rotatably assembled with the respective upper and lower roller shafts.

The contact member may include upper and lower stoppers making contact with the upper and lower contact rollers when the corresponding pair of first and second scraper-guide bars are maximally moved away from each other.

Advantageous Effects

A deburring device according to the present invention has the following effects.

(1) first and second scrapers are moved away from each other upward and downward with respect to a joint of the window frames by moving push bars forward and opening first and second scraper-guide bars upward and downward, respectively. Therefore, the first and second scrapers can be prevented from undesirably making contact or friction with the window frames when the first and second scrapers initially come into contact with the window frames to conduct the deburring operation.

(2) when the push bar is moved backward and returned to its original position, the first and second scraper-guide bars are moved to be close to each other by the elastic restoring force of an elastic member such as a rubber band or a spring mounted to the first and second scraper-guide bars. Thereby, the first and second. scrapers are brought into close contact with the opposite sides of the joint. Thereafter, the first and second scrapers assembled with the first and second scraper-guide bars, so as to be movable in a horizontal direction, are moved forward by moving a scraper rod forward. In this way, the scrapers can rapidly simultaneously remove buns generated on the opposite sides of the joint.

Therefore, time required to conduct the debarring operation can be markedly reduced, compared to the conventional technique. Thereby, work productivity can be significantly enhanced.

(3) when the push bar is moved forward again, the first and second scrapers are opened upward and downward.. Then, burrs that may be attached to the ends of the scrapers are moved away from the window frames, whereby the deburring operation can be further facilitated. Furthermore, the first and second scrapers that have been moved away from each other again can be easily moved backward and returned to their original positions without making interference with the window frames, thus completing a single operation cycle.

(4) if the deburring device is interlocked with a window case manufacturing machine, a process of manufacturing a window case can be completely automatized.

BEST MODE

The above and other objects, features and advantages of the present invention will be more clearly understood from the following detailed description taken in conjunction with the accompanying drawings. Hereinafter, a preferred embodiment of the present invention will be described in detail with reference to the attached drawings.

Figure 1A:
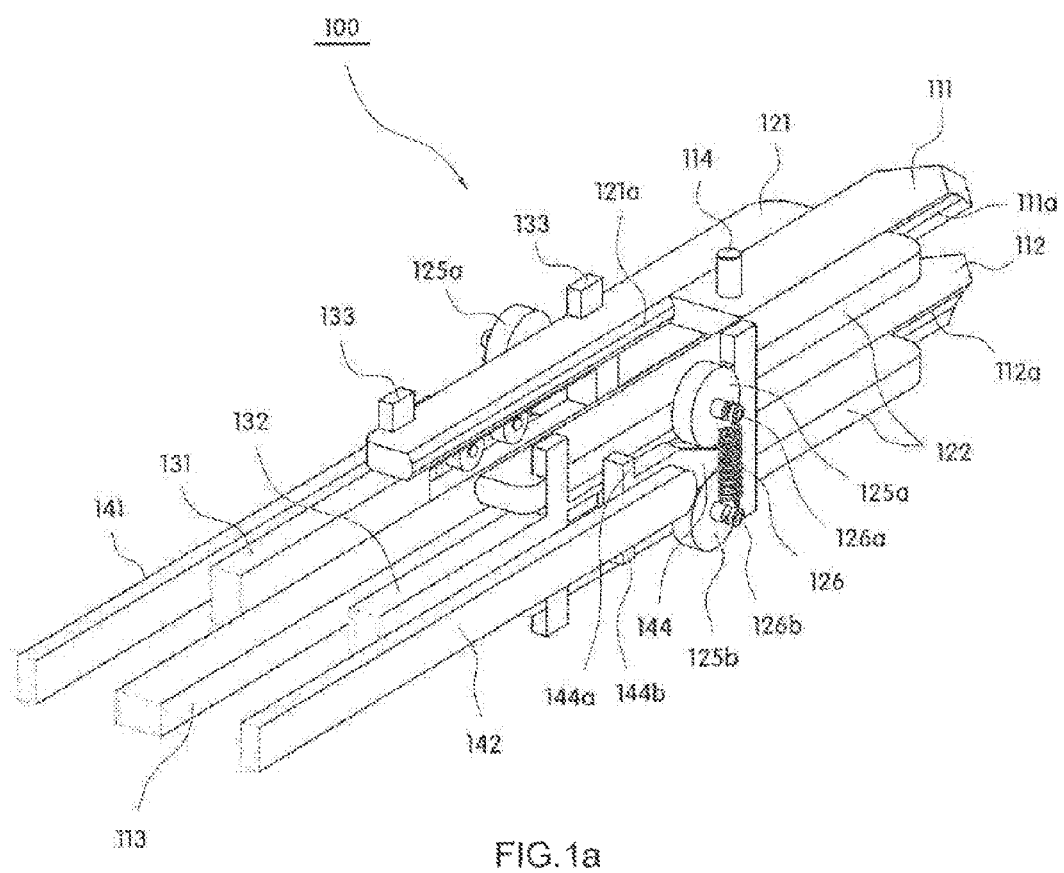
FIGS. 1a and 1b are perspective views illustrating a deburring device according to a preferred embodiment of the present invention.
Figure 1B:
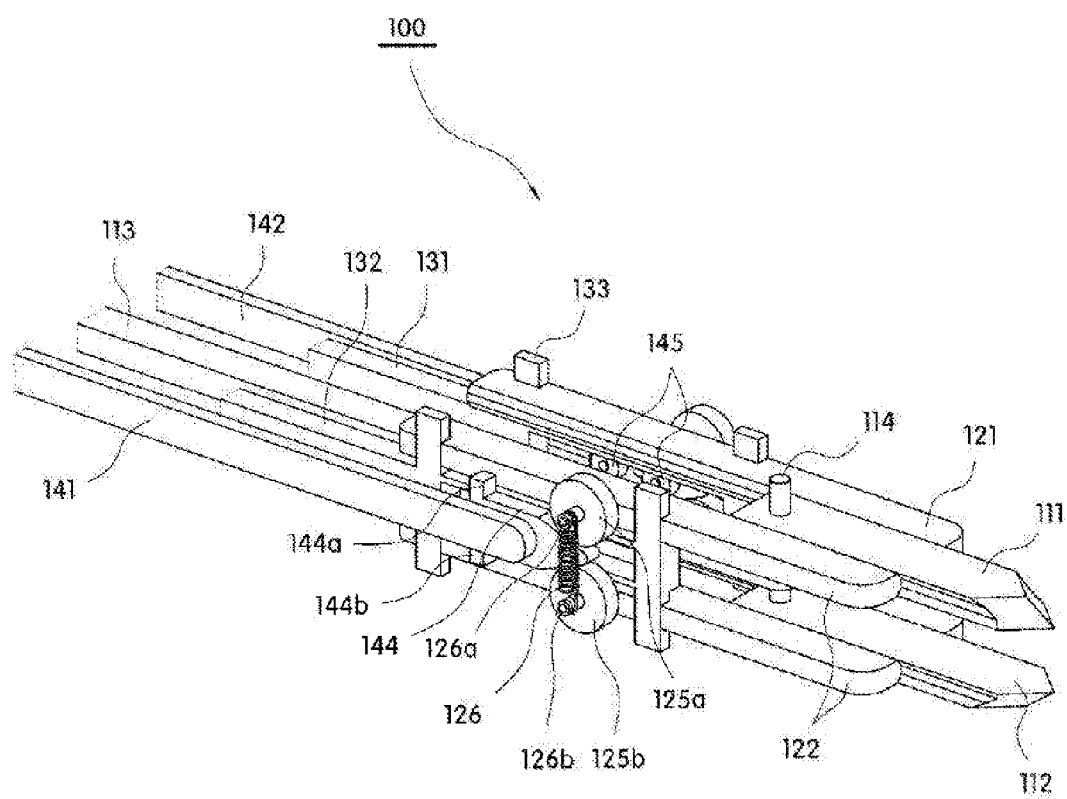
Figure 2A:
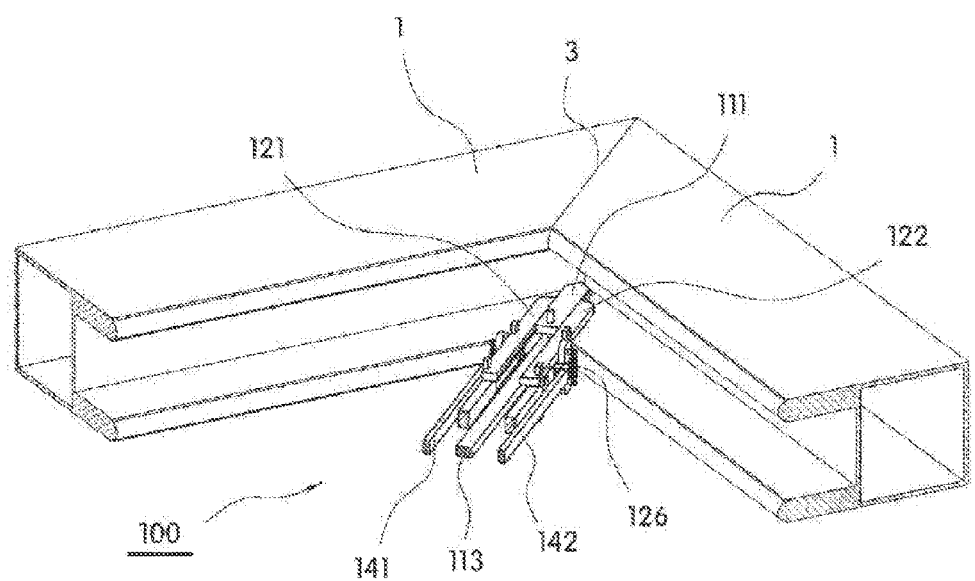
FIGS. 2a and 2b are views showing the usage of the deburring device according to the embodiment of the present invention.
Figure 2B:
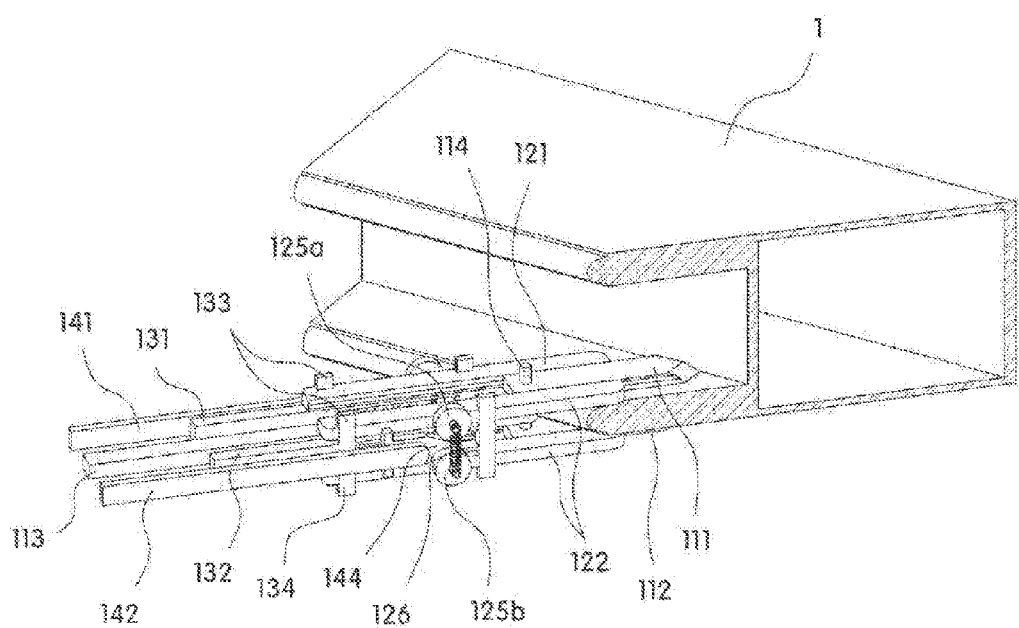
Figure 3:
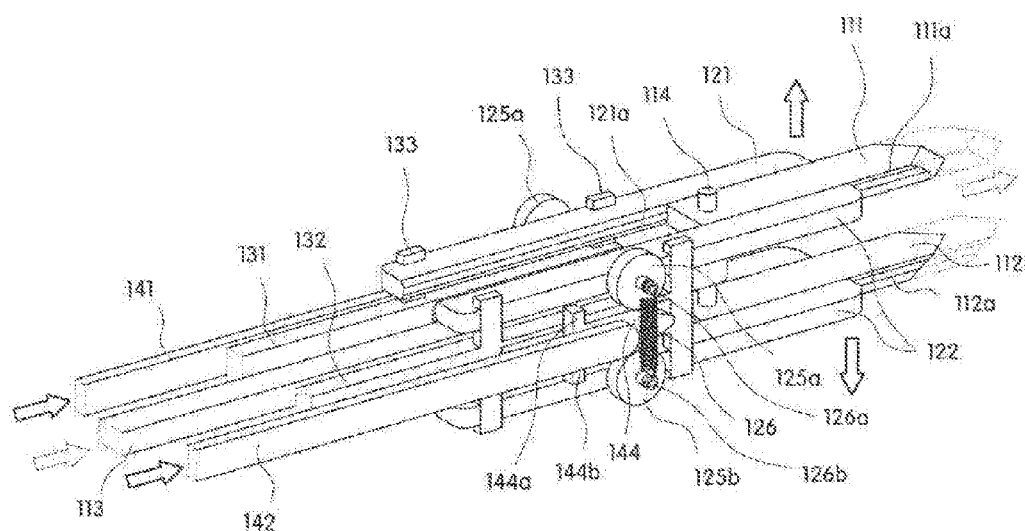
FIG. 3 is a view showing the operation of the deburring device according to the embodiment of the present invention.
Figure 4:
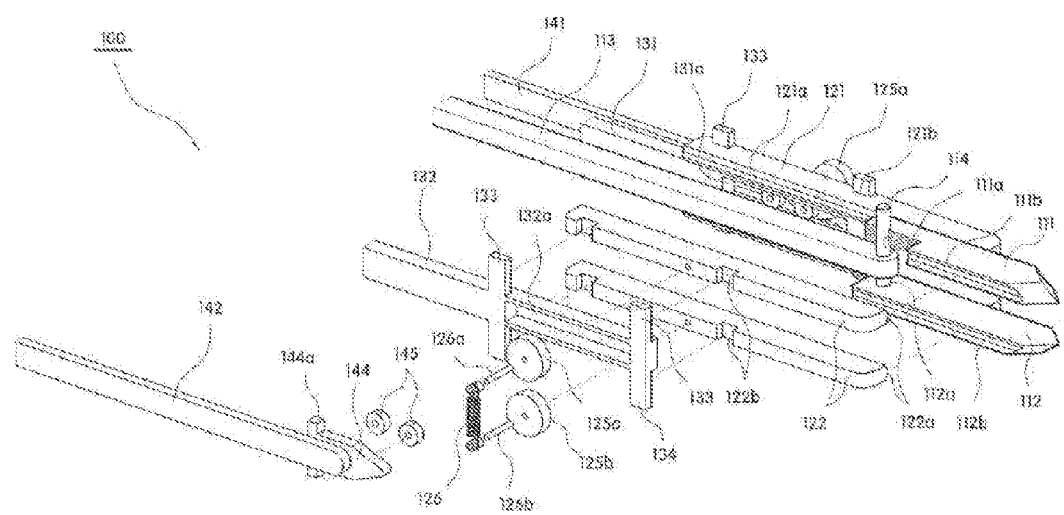
FIG. 4 is an exploded perspective view illustrating the deburring device according to the embodiment of the present invention.
Figure 5:
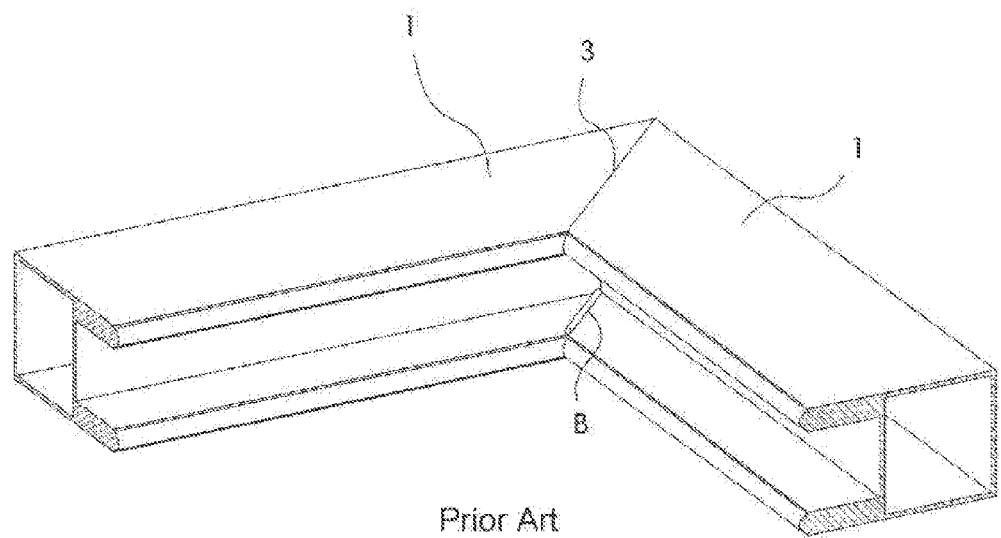
FIG. 5 is a perspective view showing a joint of a typical window frame.

As shown in FIGS. 1a through 4, a deburring device 100 according to the preferred embodiment of the present invention includes first and second scrapers 111 and 112, a pair of first scraper-guide bars 121, a pair of second scraper-guide bars 122, a pair of supports 131 and 132 and a pair of push bars 141 and 142. The deburring device 100 is configured to simultaneously remove burrs generated on inner and outer sides, that is, opposite sides, of a joint between window frames when the window frames are joined with each other.

To remove burrs generated on the inner and outer sides of the joint between the window frames when the window frames are joined with each other, the first and second scrapers 111 and 112 are provided on an end of a scraper rod 113 that has a predetermined length and is moved back and forth toward the joint by a drive source such as a reciprocating cylinder (pot shown). Each of the first and second scrapers 111 and 112 is a cutting member that has a cutting blade on a distal end thereof and removes burrs generated on the joint between the window frames.

The first and second scrapers 111 and 112 respectively have first and second guide holes 111a and 112a therein so that the first and second scrapers 111 and 112 can be vertically moved along a vertical guide rod 114 provided on the end of the scraper rod 113. That is, the first and second scrapers 111 and 112 are assembled with the vertical guide rod 124 through the first and second guide holes 111a and 112a so as to be vertically movable along with the first and second scraper-guide bars.

By virtue of the above-mentioned construction, a distance between the first and second scrapers 111 and 112 with respect to the vertical direction of the drawings can be increased or reduced to match with the thickness of the window frame.

Preferably, stoppers (not shown) are respectively protruded from or nuts (not shown) are respectively provided on upper and lower ends of the vertical guide rod 124 so as to prevent the vertical guide rod 124 from being undesirably removed from the first or second guide hole 111a or 112a when the first and second scrapers 111 and 112 along with the first and second scraper-guide bars 121 and 122 are vertically moved in directions away from each other by forward movement of the push bars 141 and 147.

The first and second scraper-guide bars 121 and 122 are guide members that are respectively assembled with left and right outer surfaces of the first and second scrapers 111 and 121 so that the first and second scrapers 111 and 112 can horizontally move back and forth under guidance of the guide members.

In this embodiment, the first and second scraper-guide bars 121 and 122 respectively have on inner surfaces thereof guide protrusions 121a and 122a that respectively correspond to slide grooves 111b and 112b formed in opposite side surfaces of the first and second scrapers 111 and 112. However, the present invention is not limited to this structure. For example, the slide grooves may be formed in the opposite side surfaces of the first and second scrapers, and the guide protrusion may be provided on the inner surfaces of the first and second scraper-guide bars.

When the scraper rod 113 moves forward and then backward, the first and second scrapers 111 and 112 assembled with the upper and lower ends of the vertical guide rod 114 move forward along the guide protrusions 121a and 122a of the first and second scraper-guide bars 121 and 122 to remove buns generated on the joint between the window frames and then move backward and return to their original positions.

The supports 131 and 132 are stationary members that guide and support the first and second scraper-guide bars 121 and 122 such that the first and second scraper-guide bars 121 and 122 that guide the forward and backward reciprocating movement of the first and second scrapers 111 and 112 during a bun removal process can vertically move forth or back to increase or reduce the vertical distance between the first and second scraper-guide bars 121 and 122.

Each support 131, 132 has on upper and lower surfaces thereof upper and lower vertical guide bars 133 and 134 that correspond to guide depressions 121b, 122b formed in the outer surfaces of the scraper-guide bars 121, 122.

In this embodiment, although the guide depressions 121b and 122b have been illustrated as being respectively finned in the outer surfaces of the first and second. scraper-guide bars 121 and 122. the present invention is not limited to this. For example, in lieu of depressions, guide holes into which the upper and lower vertical guide bars are inserted may be formed in the first and second scraper-guide bars 121 and 122.

Preferably, either stoppers (not shown are respectively protruded from: or nuts (not shown) are respectively provided on upper and lower ends of the upper and lower vertical guide bars 133 and 134 so as to prevent the upper and lower vertical guide bars 133 and 134 from being undesirably removed from the guide depressions 121b and 122b when the first and second scraper-guide bars 121 and 122 are vertically moved in directions away from each other by forward movement of the push bars 141 and 142.

The push bars 141 and 142 are actuating members that are connected to a drive source (not shown) such as an air cylinder to operate the first and second scraper-guide bars 121 and 122 assembled with the first and second scrapers 111 and 112 in such a way that the first and second scraper-guide bars 121 and 122 are vertically moved away from or toward each other.

Each push bar 141, 142 includes on a front end thereof a contact member 144 making contact with upper and lower contact rollers 125a and 125b provided on the outer surfaces of the corresponding scraper-guide bars 121, 122. Each push bar 141, 142 further includes guide members 145 moving along a guide slot 131a, 132a formed in the corresponding support 131, 132.

The upper and lower contact rollers 125a and 125b are respectively assembled. with upper and lower roller shafts 126a and 126b that are coupled to each pair of scraper-guide bars 121, 122. An elastic member 126 such as a spring or a rubber band is connected to ends of the upper and lower roller shafts 126a and 126b.

When the contact member 144 of the push bar 141, 142 enters space between the upper and lower contact rollers 125a and 125b, the distance between the ripper and lower contact rollers 125a and 125b is increased. When the push bar 141, 142 moves backward and returns to its original position, the upper and lower contact rollers 125a and 125b are moved toward each other and returned to their original positions by the elastic restoring force of the elastic member 126 connected to the ends of the upper and lower roller shafts 126a and 126b.

The upper and lower contact rollers 125a and 125b are respectively rotatably assembled with the upper and lower roller shafts 126a and 126b so that frictional resistance with the contact member 144 can be minimized.

Preferably, upper and lower stoppers 144a and 144b are provided on the contact member 144 so that when the corresponding pair of first and second scraper-guide bars are maximally moved away from each other after the contact member 144 has entered the space between the upper and lower contact rollers 125a and 125b, the upper and lower stoppers 144a and 144b make contact with the upper and lower contact rollers 125a and 125b and thus prevent the upper and lower contact rollers 125a and 125b from being removed from the contact member 144.

The contact member 144 has on the front end thereof inclined surfaces, each of which is inclined at a predetermined angle, so that the vertical opening operation of the first and second scraper-guide bars can be facilitated when the contact member 144 makes contact with the upper and lower contact rollers 125a and 125b. Therefore, When the contact member 144 moves forward, the vertical distance between the upper and lower contact rollers 125a and 125b making contact with the inclined surfaces can be easily increased in proportion to a degree to which the contact member 144 moves forward.

The operation of removing, burrs B formed on the opposite surfaces of the joint 3 between the window frames using the debarring device 100 haying the above-mentioned construction will be explained below. First, the first and second scrapers 111 and 112 are located at a position corresponding to the joint 3.

If the thickness of the window frames 1 is larger than the vertical distance between the first and second scrapers 111 and 112 that are in the original state and the window frames 1 cannot be inserted between the first and second scrapers 111 and 112, the push bars 141 and 142 are primarily moved to a predetermined distance.

Then, the inclined surfaces formed on the front end of the contact member 144 make contact with the upper and lower contact rollers 125a and 125b and thus increase the distance between the upper and lower contact rollers 125a. and 125b. Thereby, the first and second scrapers 111 and 112 along with the first and second scraper-guide bars 121 and 122 assembled with the supports so as to be vertically movable are vertically moved away from each other so that the distance between the first and second scrapers 111 and 112 is increased to be slightly greater than the thickness of the window frames.

Thereafter, if the scraper rod 113 is primarily moved forward to a predetermined distance, the first and second scrapers 111 and 112 slidably assembled at the opposite side surfaces thereof with the first and second scraper-guide bars 121 and 122 are moved to a front end of the joint 3 without being stopped by the window frames.

Subsequently, when the push bars 141 and 142 are moved backward and returned to their original positions, the contact member 144 is moved backward. Then, the first and second scraper-guide bars 121 and 122 assembled with the upper and lower vertical guide bars 133 and 134 of the supports 131 and 132 are vertically moved to be close to each other by the elastic restoring force of the elastic member 126 connected to the upper and lower roller shafts 126a and 126b of the upper and lower contact rollers 125a and 125b. Thereby, the first and second scrapers 111 and 112 coupled to the first and second scraper-guide bars 121 and 122 are brought into close contact with the joint of the window frames.

Thereafter, when the scraper rod 113 is secondarily moved forward by the air cylinder (not shown), the first and second scrapers 111 and 112 that are slidably provided between the first and second scraper-guide bars and has been brought into close contact with the opposite surfaces of the joint of the window frames are moved forward along with the scraper rod 113, thus simultaneously removing buns generated on the opposite surfaces of the joint.

Although the preferred embodiment of the present invention has been disclosed for illustrative purposes, those skilled in the art will appreciate that various modifications. additions and substitutions are possible, without departing from the scope and spirit of the invention as disclosed in the accompanying claims.

The invention claimed is:

1. A deburring device for removing buns generated on a joint between window frames, comprising:
   first and second scrapers provided on an end of a scraper rod that is moved back and forth toward the joint to remove the burrs;
   a pair of first scraper-guide bars and a pair of second scraper-guide bars assembled with left and right side surfaces of the first and second scrapers so that the first and second scrapers are supported by the first and second scraper-guide bars so as to be capable of moving back and forth in a horizontal direction;
   a pair of supports respectively assembled with corresponding left and right outer surfaces of the first and second scraper-guide bars so that the first and second scraper-guide bars are supported by the supports so as to be capable of moving back and forth in a vertical direction; and
   a pair of push bars provided to vary a distance between the first and second scrapers, each of the push bars including: on a front end thereof a contact member making contact with corresponding upper and lower contact rollers provided on the left and right outer surfaces of the first and second scraper-guide bars; and a guide member moving back and forth along a guide depression formed in the corresponding support.

2. The deburring device of claim 1, wherein the first and second scrapers respectively have first and second guide holes therein. so that the first and second scrapers are vertically guided by a vertical guide rod provided on a front end of the scraper rod, the first and second scrapers being assembled with the vertical guide rod so as to be slidable in the vertical direction through the first and second guide holes.

3. The deburring device of claim 1, wherein each of the first and second scraper-guide bars comprises, on an inner surface thereof, a guide protrusion assembled with a corresponding one of the slide grooves formed in outer surfaces of the first and second scrapers.

4. The deburring device of claim 1, wherein each of the supports comprises, on respective upper and lower surfaces thereof upper and lower vertical guide bars assembled with corresponding guide depressions formed in outer surfaces of the first and second scraper-guide bars.

5. The deburring device of claim 1, wherein the upper and lower contact rollers are respectively assembled with upper and lower roller shafts provided on the first and second scraper-guide bars, and an elastic member is connected to ends of the upper and lower roller shafts of each pair of the first and second scraper-guide bars.

6. The deburring device of claim 5, Wherein the upper and lower contact rollers are rotatably assembled with the respective upper and lower roller shafts.

7. The deburring device of claim 1, wherein the contact member comprises upper and lower stoppers making contact with the upper and lower contact rollers when the corresponding pair of first and second scraper-guide bars are maximally moved away from each other.

* * * * *